3,141,013
PURIFICATION OF TRANSESTERIFICATION
MIXTURES
Charles J. O'Boyle, Gramercy, La., assignor to North American Sugar Industries Incorporated, New York, N.Y., a corporation of New Jersey
No Drawing. Filed Mar. 6, 1963, Ser. No. 263,349
17 Claims. (Cl. 260—210)

This invention relates to a process for refining esters of polyhydric alcohols, and, in particular, it is concerned with the method for removing impurities from crude reaction mixtures in which esters of polyhydric alcohols have been prepared by transesterification.

The invention provides improvements and procedures for the preparation of esters of solid polyhydric alcohols by which an ester product containing only very small amounts of undesirable processing solvents is obtained.

The esters of solid polyhydric alcohols which are to be purified within the scope of this invention are useful as chemical intermediates and surface-active agents. As chemical intermediates, they are useful in the preparation of synthetic resins, waxes, drying oils, and lubricants. As surface-active agents, they are useful as emulsifiers, solubilizers, dispersing and wetting agents, textile processing assistants, and ingredients in detergents, cosmetics, pharmaceuticals and foods.

Ester compositions of the type sought to be made and purified have found only limited commercial use, in spite of their value in the applications mentioned above, because of difficulties which have been experienced in isolating and refining them after they have been synthesized.

The ester products described above are generally made by a transesterification reaction between a polyhydric alcohol and an ester (for example, a methyl ester or triglyceride fat) as represented by the equation:

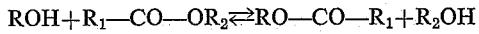

$$ROH + R_1\text{---}CO\text{---}OR_2 \rightleftarrows RO\text{---}CO\text{---}R_1 + R_2OH$$

where R represents the residue of the polyhydric alcohol, $R_1$ represents the residue of the carboxy acid moiety of the ester reagent, and $R_2$ represents the residue of the alcohol moiety of the ester reagent.

To carry out the reaction effectively one or more solvents are required at various stages of the process. Reaction solvents, also referred to as primary solvents are required in order to get the reagents in the same phase so that the reaction may proceed at a satisfactory rate. To minimize side reactions in the synthesis of esters, moderate temperatures are generally required. Such moderate temperatures further enhance the need for reaction solvents to dissolve the polyhydric alcohol and ester reagents. An important part of the practical process is the recovery of the desired reaction product free from such solvents.

The ester products which are within the scope of this invention are ones which contain substantial amounts of monoesterified polyhydric alcohol. In order to obtain these products it is necessary to use a large amount of polyhydric alcohol in the reaction mixture and to have an excess of unreacted polyhydric alcohol in the reaction mass at the end of the synthesis. This unreacted polyhydric alcohol may be separated from the reaction mass to give the crude reaction product by adding a solvent, also known as a secondary solvent, which selectively precipitates the unreacted polyhydric alcohol. Such a process is disclosed and claimed in my co-pending application Serial No. 33,116, filed June 1, 1960, of which this application is a continuation-in-part. Most of the precipitating solvent is removed from the crude product, usually by distillation.

Crude reaction products suitable for use in this process can also be obtained by separating the bulk of unreacted solid polyhydric alcohol using other procedures including those described in United States Patent 2,893,990.

In some cases removal of most of the unreacted fatty reagents may also be desirable. When solvent extraction is used for this operation, additional residues of undesirable processing solvents may be left in the crude product.

It is generally desirable to remove as completely as possible the primary and secondary and other processing solvents used in connection with the foregoing procedures, since some of these processing solvents are toxic, or irritating to the eyes and/or skin, and others, even though non-toxic, impart an undesirable odor or flavor to the product. Only very small residues of these undesirable processing solvents can be tolerated in important uses of the ester products such as those which require their incorporation in detergents for laundering and dishwashing, in toilet goods such as shampoos, in pharmaceutical products, such as salves, in cosmetic creams, and in foods, such as oleomargarine, shortenings, frozen desserts, dehydrated fruit and vegetable products, etc. In the past, the ester products produced have contained residues of these solvents which were so large that the products were unfit for these uses. One of the purposes of this invention is the reduction of the residues of undesirable solvents so that the ester products will be suitable for these uses.

Further, recovery of the processing solvents is important from an economic standpoint. The solvents required, particularly the reaction solvents, are relatively expensive, and since they add no value to the products, substantially complete solvent recovery is desirable to make the process economically attractive.

It is therefore an object of this invention to provide a method for substantially complete removal and recovery of these processing solvents from the ester product.

This and other objects of the invention are realized by incorporating certain oxygenated hydrocarbon solvents, hereinafter called fluxing agents, in the crude mixture and thereby making it possible to distill or evaporate substantially all of the undesirable processing solvents. Because of the low toxicity, freedom from tending to irritate the skin and eyes and freedom from objectionable odor and flavor, residues of many of the fluxing agents of the present invention do not interfere with the use of the ester products in detergents, toilet goods, foods, drugs or cosmetics. In cases where the ester product is not to be used in foods or drugs, or in the more critical and sensitive areas of use in detergents, toilet goods and cosmetics, the fluxing agent may be chosen from a broader range of materials.

Although the invention is not to be limited to any theory, experimental observations indicate that as the processing solvents are evaporated from the crude mixture the mass tends to lose fluidity and become hard. This tendency is accentuated by the presence of even small amounts of unreacted solid polyhydric alcohol, such as sucrose. Because of this tendency, residual processing solvents in the mass are not readily reduced to very low concentrations. Fluxing agents, according to the present invention, impart fluidity to the mass during the final stages of distillation, and thereby facilitate removal of residual processing solvents.

More specifically, in the process to which the present invention is applicable, esters of solid polyhydric alcohols are prepared by reacting the solid polyhydric alcohol in a transesterification reaction with an ester of a simpler alcohol and a carboxylic acid under conditions to form esters of the solid polyhydric alcohol with the acid and to release the alcohol. The reaction is carried out in the presence of a primary solvent and an alkaline catalyst for the reaction, and preferably utilizes a large excess of solid polyhydric alcohol to promote formation of a large proportion of monoesterified solid polyhydric alcohol.

Subsequent to the reaction, one or more partial separation steps may be carried out. Such steps may include distillation of the reaction to a congealed mass, or partitioning of the reaction product between two or more immiscible solvents such as brine and butanol, followed by distillation of the butanol rich layers to obtain a crude ester product. In the preferred embodiment, after any remaining alkaline catalyst has been neutralized, the reatcion mass is mixed with a secondary solvent to precipitate unreacted solid polyhydric alcohols, and the solvent-ester mixture thereafter distilled to produce an ester product as described in my co-pending application referred to above.

Each of these procedures will produce a crude mixture of the desired ester product and processing solvents. The amount of processing solvents will vary from 0.5%, or less if efficient separating procedures are used, to in excess of 50% if no separation steps are used. The crude mixture may be either solid or liquid depending on the amount of solvent present. According to the present invention, a fluxing agent is added to the crude mixture and the crude mixture including the fluxing agent is distilled to separate the processing solvents from the ester product. The fluxing agent has the property of, and is added in an amount sufficient for maintaining the crude mixture in a fluid or soft plastic state during distillation.

Generally, the solid polyhydric alcohols that can be used effectively in the process of the present invention are those described in my co-pending application referred to above. Materials to which the invention is most advantageously applied include sucrose, raffinose, sorbitol, mannitol, methyl glucoside and ethyl glucoside. Mixtures of the solid polyhydric alcohols can also be used. Such mixtures include mixtures of sucrose and raffinose obtained in the refining of beet sugar and mixtures of sorbital and mannitol which are obtained by reduction of corn sugar and invert sugar.

A number of primary reaction solvents may be used for the transesterification reaction. Useful primary solvents are described in detail in my above mentioned co-pending application. Four groups are defined. These are briefly summarized as follows:

The first group consists of mono- and di-alkyl and alkoxy-alkyl amides of lower fatty acids, the amides containing from 3 to 8 carbon atoms. The group includes dimethyl formamide; dimethyl acetamide; N n-amyl, N methyl formamide; N,N di(methoxyethyl) formamide; N methyl, N ethoxyethyl formamide; and N methyl formamide.

The second group is composed of amides of lower fatty acids in which the nitrogen forms part of a heterocyclic ring system. This group of primary solvents includes N formyl morpholine, N acetyl morpholine; N propionyl morpholine; dimethyl, N formyl morpholine; N formyl piperidine and N acetyl piperidine.

The third group of primary solvents are tertiary amines having one, two or three alkoxy-alkyl radicals, and having less than 9 carbon atoms. Examples include dimethyl methoxyethyl amine; methyl, dimethoxyethyl amine; dimethyl, ethoxyethyl amine; methyl, ethyl methoxyethyl amine; dimethyl, 2-methoxypropyl amine; and tri-(methoxyethyl) amine.

The fourth group of primary solvents are the N alkyl pyrrolidones and caprolactams. Examples include N methyl 2 pyrrolidone; N butyl pyrrolidone; and N methyl caprolactam. Mixtures of the primary reaction solvents described above may also be used.

The ester reactants which may be used in the transesterification reaction are derived from the aliphatic alcohols, glycols, glycerine and other polyols and monocarboxylic acids having about 8 to 32 carbon atoms and di- and polycarboxylic acids having from 8 to about 60 carbon atoms, the acids being free of groups which would interfere with the transesterification reaction and containing no more than 2 oxygen atoms in addition to those in the carboxyl groups. Some of these ester reactants are: tallow and other fats, cottonseed, coconut, oiticica, castor and other vegetable oils, fish and whale oils, methyl esters of tall oil fatty acids, methyl esters of rosin acids, methyl esters of naphthenic acids derived from petroleum, the ester component of various vegetable waxes such as carnauba and sugar cane wax, ethyl oleate, ethyl stearate, ethyl benzoate, dimethyl sebacate, dimethyl azeleate, the isomeric dimethyl phthalates, methyl esters of di and tribasic acids which are obtained by polymerization of mixtures of mono-, di- and tri-unsaturated fat acids, methyl esters of the tri- and polybasic acids which can be prepared by condensation of methyl esters of maleic and fumaric acids with methyl esters of oleic, linoleic and other unsaturated fatty acids, methyl linoleate, ethyl esters of tallow fatty acids and the like, and mixtures of these esters.

In the practice of the foregoing invention it is preferred to select the polyhydric alcohol reactants from the group consisting of sucrose, raffinose, sorbitol, mannitol and methyl glucosides, and the ester reactant from compounds which provide acyl moieties from fatty acids containing from 8 to 32 carbon atoms. Typical preferred products are the esters which are derived from sucrose, raffinose, sorbitol and mannitol, with caprylic, capric, lauric, myristic, myristoleic, palmitic, palmitoleic, stearic, oleic, elaidic, linoleic, linolenic, arachidic, erucic, arachidonic, behenic, lignoceric and clupanodonic acids.

Because of its excellent solvency power and favorable volatility, dimethyl formamide is the preferred reaction solvent. Other preferred solvents are dimethyl acetamide, diethyl formamide, diethyl acetamide, di-methyl propionamide, and N methyl pyrrolidone.

To obtain high yields of the monoesterified polyhydroxy alcohol product, the catalyst should be inactivated before or during separation of the unreacted polyhydric alcohol. Inactivation of the catalyst may be effected by running the reaction so long that side reactions, such as soap formation, consume the catalyst. Preferably, however, the catalyst is neutralized by the addition of an acid. Strong acids such as the dibasic and tribasic carboxylic acids, mineral acids, and the sulfonic acids are preferred for this purpose. Typical preferred acids include citric acid, tartaric acid, fumaric acid, adipic acid, itaconic acid, and aconitic acid. Weaker acids, such as the monobasic carboxy acids, i.e., acetic acid, etc., may also be used, as well as the acid salts of the polybasic acids.

As indicated above, one of the principal objectives of the present invention is to obtain a product containing only very small amounts of processing solvents so as to make it more acceptable for usage in applications where a tolerance for such materials is very low. This is accomplished by incorporating in the crude reaction product a suitable amount of a fluxing agent which is a polar organic solvent.

The process of the invention is generally carried out by incorporating the fluxing agent in the crude reaction mass and distilling under vacuum, thereby distilling off most of the undesirable residual processing solvents. Nitrogen, carbon dioxide, methane ethane or other inert gas may be bubbled through the still charge or passed over it in order to facilitate distillation of the undesirable solvent residues. Vapors of solvents which are chemically inert and very volatile under the distillation conditions such as water, ethyl acetate, acetone, isopropanol, heptane and tetrapropylene, may also be used for this purpose. These solvents may be charged as liquids at the beginning of the distillation, or as liquids or vapors continuously or intermittently during the distillation operations. In some cases it may be desirable to carry out the distillation under a fractionating column thereby to retain most of the fluxing agent in the pot, and permit the escape of the residual processing solvents and other impurities. The fluxing agent may also be incorporated in the system continuously or in incremental amounts as the distillation proceeds thereby to keep the mole fraction and vapor pressure of the processing solvents and other impurities as high as possible so as to expedite their removal.

It is desirable that the distillation be carried out at a temperature below that at which appreciable decomposition occurs. As previously noted, the ester products may tend to undergo thermal decomposition or other reactions rather easily. Accordingly, it will generally be preferred to maintain the pot temperature at below 140° C. Circumstances may require that the temperature be even lower in some cases while somewhat higher temperatures may be permissible in other cases. For example, if the time of distillation is short as in the case of flash distillation, higher temperatures may be tolerated. On the other hand, if the time of distillation is unusually long, lower temperatures may be preferred in order to keep the extent of decomposition within tolerable limits.

The fluxing agent serves to maintain the crude reaction material in a more fluid state having a desirable low viscosity which facilitates agitation, thus permitting rapid distillation without local superheating and burning. When the mass being distilled is too viscous to agitate, the fluxing agent prevents case hardening and thus facilitates evaporation of the undesirable solvent residues even when the operation is carried out in unagitated pans in a vacuum oven.

The fluxing agents are organic compounds which contain at least two polar groups selected from among hydroxyl, carboxyl, carboxy ester, and ketone carbonyl, and which are free from other groups. They contain from 2 to 12 carbon atoms and have at least one oxygen atom for every 3 carbon atoms.

Suitable fluxing agents within the scope of the invention include:

(a) The aliphatic diols having 2 to 6 carbon atoms, and esters of these diols with the lower fatty acids which have from 2 to 4 carbon atoms in the molecule. These materials include ethylene glycol, the propylene glycols, the butane diols, triethylene glycol, di-propolyene glycol, 2,2-dimethyl-1,3-butanediol and esters of these compounds with acetic, propionic, butyric, and isobutyric acids in which one or both of the hydroxyls of the diol are esterified.

(b) The aliphatic triols having from 2 to 6 carbon atoms and esters of these triols with the lower fatty acids which have from 2 to 4 carbon atoms in the molecule. These materials include glycerine, the butane triols, 1,2,6-hexanetriol, and esters of these compounds with acetic propionic, butyric and isobutyric acids in which 1, 2 or 3 of the hydroxyls of the triol are esterified.

(c) Esters of aliphatic di-carboxylic acids having from 4 to 6 carbon atoms and malic acid with lower monohydric primary and secondary aliphatic alcohols, the esters having from 5 to 10 carbon atoms in the ester molecule. Suitable lower monohydric alcohols are those having from 1 to 4 carbon atoms inclusive. Full esters and partial esters are included. Specific examples include mono and diesters of methyl, ethyl, propyl or butyl alcohols with the following acids: fumaric, maleic, succinic, adipic, and itaconic.

(d) Esters of methyl and ethyl alcohols with the following acids: aconitic, tartaric and citric.

(e) Esters of lactic acid with the lower primary and secondary aliphatic monohydric alcohols having from 3 to 6 carbon atoms; also esters with the aliphatic diols having from 2 to 6 carbon atoms in which only one hydroxyl of the diol is esterified.

(f) Esters of acetoacetic acid and levulinic acid with the primary and secondary aliphatic monohydric alcohols which have from 1 to 5 carbon atoms; also esters with the aliphatic diols having from 2 to 6 carbon atoms in which only one hydroxyl of the diol is esterified.

(g) Mixtures of the various fluxing agents described above may also be used.

An important criterion in the selection of a suitable fluxing agent, in cases where the bulk of the fluxing agent is to be removed, is the vapor pressure, particularly in relation to the vapor pressure of the solvent or other material to be removed. It is desirable that the vapor pressure of the fluxing agent be less than that of the solvent in order that it will not be distilled more rapidly than the solvent. In this way the batch does not become too viscous before essentially all the undesirable solvent is removed. If the vapor pressure of the fluxing agent is not too low, the fluxing agent may be distilled in the process, thereby carrying with it traces of solvent which otherwise would be very difficult to remove. When less volatile fluxing agents are used, the undesirable solvents may be removed by sweeping the system with steam or equivalent vapor as discussed above.

Still another requirement is that fluxing agents have a suitable plasticizing and solvent power. The fluxing agent must be a good plasticizer for the ester product in order to maintain the reaction product in a soft plastic or liquid state under process conditions so as to facilitate agitation which increases the rate of transfer of undesirable process solvents to the surfaces of the mass in the still, thus increasing the rate of distillation. The fluxing agent should also have sufficient solvent power for the polyhydric alcohol ester product and polyhydric alcohol raw material so that the tendency of the product to change composition by reactions, which tend to advance by precipitation of the polyhydric alcohol, is minimized.

The selection of a particular fluxing agent under any set of conditions will also depend upon esthetic factors such as taste and odor.

The amount of fluxing agent is subject to a considerable degree of variation depending upon the type of crude reaction mixture and other conditions. If there is a very small amount of solvent to be removed and/or a good vacuum (low absolute pressure) is available, smaller amounts of fluxing agent may be adequate. On the other hand, if there is a relatively large amount of unreacted polyhydric alcohol in the crude reaction mixture (which tends to stiffen the liquid mass) or the distillation equipment is able to properly agitate only charges of relatively low viscosity, larger amounts of fluxing agent will generally be required. Generally, it is desirable to use the minimum amount of fluxing agent that will bring about the desired results. However, in some cases a residue of fluxing agent may impart desirable properties to the ester product. In that event an amount of fluxing agent in excess of the minimum may be used during the stripping, or additional fluxing agent may be added after the stripping is completed.

Generally, at least 1% (based on the sum of the weights of polyhydric alcohol ester and unreacted polyhydric alcohol in the crude reaction mixture) of fluxing agent is charged to the crude product before starting the stripping and more may be desirable depending on the factors discussed above. Quite often, depending on the type of apparatus which is being used, it will be preferred to use considerably larger quantities, such as 20 to 200% by weight. Since all fluxing agents are volatile under the conditions of stripping, the amounts of fluxing agent present vary during the course of the stripping distillation, except in those procedures in which fluxing agents are fed continuously during the stripping at a rate equal to the rate at which it is being distilled. In cases where a single charge of fluxing agent is made at the start of the distillation, and when the fluxing agent is charged intermittently, with or without interruptions in the distillation, the amount of fluxing agent present may vary widely during the stripping procedure. When the stripping is carried out in a still which is able to properly agitate only charges of relatively low viscosity, the amount of fluxing agent in the product at the end of the stripping may be 20% or more. When a still which is able to agitate very viscous charges is used for the whole stripping, or for the last stage of the stripping, it may be possible to complete the stripping with less than 1% of fluxing agent in the product.

When the amount of fluxing agent present in the stripped product is too high for the use to which it is to be put, either for technical or economic reasons, extraction or crystallization of the product using certain volatile solvents may be used to reduce the content of residual fluxing agent to satisfactory concentrations. These solvents are water, aqueous solutions of inorganic salts, such as NaCl and $Na_2SO_4$, methanol, ethanol, the propanols, secondary butyl alcohols, acetone, methyl ethyl ketone, diethyl ketone, methyl isopropyl ketone, dimethyl ether, diethyl ether, diisopropyl ether, the esters of the lower aliphatic alcohols having 1 to 3 carbon atoms with the lower fatty acids having 1 to 3 carbon atoms, and the lower aliphatic hydrocarbons having boiling ranges which are below 115° C. The selection of the solvent to be used for the extraction or crystallization depends on the nature of the solid polyhydric alcohol ester product, on the nature of the fluxing agent, and on the temperature at which the washed or crystallized product is separated from the mother liquor in the purification process.

The following examples illustrate the application of the invention.

EXAMPLE I

A Baker Perkins mixer, which was steam jacketed, having two internally mounted sigma blade agitators and a vacuum tight cover which carried a thermometer well, was connected to a vacuum pump through an efficient condensing system. 4900 grams of technical grade sucrose monopalmitate, which was prepared by a procedure which is essentially the same as that described in Example 12 of my copending application 33,116 except that it was made in a series of separate batches in which most of the sugar charge to each batch was recovered sugar from a previous batch in the series, and which contained approximately 1.7% dimethyl formamide, approximately 12% uncombined sugar, and having a saponification number of approximately 96, and 2100 grams of a fluxing agent, propylene glycol (U.S.P. grade), were charged into the vessel. The charge was agitated and heated at 80% C. for one hour. During this time the pressure in the vessel was steadily reduced so as to cause distillation of the dimethyl formamide and propylene glycol. At the end of one hour the pressure in the vessel was 0.63 mm. Hg, the lowest pressure obtainable under these conditions. The steam pressure in the jacket was increased to raise the vessel temperature. The minimum obtainable pressure in the vessel was maintained for an additional one-half hour while the temperature was rising so as to continue distillation. At the end of this period the pressure was 0.5 mm. Hg and the temperature was 110° C. Steam was then shut off, the jacket vented and the mixer was flushed with nitrogen.

The above described distillation procedure was repeated twice more using 2100 gram charges of U.S.P. propylene glycol each time. The first, second and third distillates weight 1875, 2083, and 2124 grams respectively and contained 3.49, 0.26 and 0.06% dimethyl formamide respectively.

At the end of the third distillation the batches were cooled and agitated while running refrigerated water to the mixer jacket to break up the solidified mass. The product discharged from the mixer weighed 4825 grams. It contained approximately 0.023% dimethyl formamide and approximately 14% uncombined sugar, and had a saponification number of approximately 91.

EXAMPLE II

The precedure of Example I was repeated on another 4900 gram charge of the same technical sucrose monopalmitate. In place of the three propylene glycol charges of fluxing agent three 2100 gram charges of propylene glycol monoacetate were used. The first, second, and third distillates weighed 2009, 2008, 2153 grams and contained 3.57, 0.23 and 0.17% of dimethyl formamide, respectively. The solid product recovered weighed 4857 grams and contained 0.018% dimethyl formamide and approximately 16% uncombined sugar and had a saponification number of approximately 91.

EXAMPLE III

The procedure of Example I was repeated on a 5000 gram charge of technical grade sucrose monotallowate which was made by essentially the same procedure as the technical sucrose monopalmitate used in Examples I and II, including neutralization of the alkaline catalyst with acetic acid before precipitation and separation of the bulk of the unreacted sugar and removal of the bulk of the undesirable processing solvents, and which contained approximately 2.7% dimethyl formamide, and 9.4% uncombined sugar, and had a saponification number of approximately 91. In this example propylene glycol monobutyrate was used as the fluxing agent in three 1200 gram charges. The first, second and third distillates weighed 932, 1225, and 1275 grams and contained 1.05%, 0.55%, and 0.08% dimethyl formamide respectively. The product weighed 4918 grams and contained 0.01% dimethyl formamide and approximately 10% uncombined sugar and had a saponification number of approximately 90.

EXAMPLE IV

The procedure of Example I was repeated on a 19.6 lb. charge of crude sucrose monolaurate, which was made by essentially the same procedure as the technical grade sucrose monoesters used in Examples I thru IV except that the catalyst was neutralized with citric acid instead of acetic acid and which contained approximately 4% dimethyl formamide. The product was purified by 2 distillations each using 3.5 lb. charges of propylene glycol diacetate. In the first of these distillations the final temperature was only brought to 100° C. The first and second fractions of propylene glycol diacetate distilled weighed 2.80 and 4.44 lbs. respectively and contained 18.1% and 4.0% dimethyl formamide respectively. The final product weighed 19.1 lbs. and contained 0.1% dimethyl formamide, approximately 4.0% uncombined sucrose and had a saponification number of approximately 112.

The additional examples tabulated below are carried out according to procedures which illustrate the invention as applied to other types of ester products containing other undesirable processing solvents, using other fluxing agents, and stripping procedures; Examples V and VI, below, illustrate the use of a single charge of fluxing agent with stripping using a conventional anchor agitator kettle (with a distilling column in the case of Example VI), and Examples VII through XI illustrate the use of a single charge of fluxing agent in a single stripping operation in a Baker Perkins Mixer similar to the one used for Examples I through IV.

selected from the group consisting of aconitic, tartaric and citric, (e) esters of lactic acid with the lower primary and secondary aliphatic monohydric alcohols having from 3 to 6 carbon atoms and aliphatic diols having from 2 to 6 carbon atoms in which only one hydroxyl of the diol is esterified, (f) esters of acetoacetic acid and levulinic acid with

Table I

| Example No. | Crude Ester Product [1] | Processing Solvent | Amount of Solvent,[2] percent | Fluxing Agent | Amount of Flux [2] | Product Composition | |
|---|---|---|---|---|---|---|---|
| | | | | | | Percent Fluxing Solvent | Percent Processing Solvent |
| V | Sorbitol monopalmitate [5] | N-methyl-2-pyrrolidone | 2 | Glycerol [4] | 40 | 30 | <0.005 |
| VI | Mannitol monocaprate | N,N-diethyl acetamide | 10 | n-Butyl lactate [3] | 30 | 15 | 0.1 |
| VII | Sucrose monolaurate | N,N-dimethyl formamide | 4 | Monomethyl adipate | 20 | 3 | 0.07 |
| VIII | Raffinose monotallowate | do | 5 | Ethyl levulinate | 20 | 0.6 | 0.09 |
| IX | Methyl glucoside monolaurate | N-formyl morpholine | 2 | 1:1:1 mixture of Mono, di- and triacetins | 15 | 6 | 0.3 |
| X | Raffinose monolaurate | N,N-dimethyl acetamide | 3 | 2,2-dimethyl-1-3 butane diol | 25 | 1.3 | .08 |
| XI | Sorbitol monolaurate | N-methyl, N-ethyl formamide | 0.8 | diethyl adipate | 30 | 0.9 | <0.005 |
| XII | Sorbitol monooleate | dimethyl acetamide | 0.6 | monoacetin | 1.5 | 0.4 | 0.08 |

[1] In preparations of these crude products alkaline catalyst was neutralized at end of transesterification reaction and bulk of unreacted polyhydric alcohol and processing solvents removed according to prodecure of Example I, application 33,116.
[2] Percent by weight on the sum of the polyhydric alcohol ester and the unreacted polyhydric alcohol in the crude mixture.
[3] Stripping is done under a fractioning column at a high reflux ratio so that a nearly pure processing solvent is obtained as a distillate and the fluxing agent is continuously returned to the pot and when diethyl acetamide concentrate in bath was reduced to 0.7%, reflux was stopped and ½ of n-butyl lactate was distilled.
[4] Steam sparging is used to remove residual processing solvent with stripping carried out in a kettle with anchor agitator.
[5] The product ester content of these crude preparations is more than 50% by weight monoesterified polyhydric alcohol, but substantial amounts of di- and polyesterified solid polyhydric ester product may be present.

Although the invention has been described with reference to specific materials and procedures it is understood that modifications thereof are to be included within the scope of the appended claims. For instance other impurities such as alcohols and ketones which may be present because used in the synthesis and purification of the ester product, may also be removed by the process of this invention.

I claim:

1. In a process for refining esters of solid polyhydric aliphatic alcohols and carboxy acids, said ester having been synthesized by a transesterification reaction between said polyhydric alcohol and another ester under conditions which yield a crude mixture which has been stabilized by deactivation of the alkaline transesterification catalyst, and which contains an ester product which is over 50% by weight monoesterified polyhydric alcohol ester, and at least one impurity removable by distillation under vacuum, the improvement which comprises incorporating in said crude mixture at least one fluxing agent which is an oxygenated polar organic compound having a vapor pressure under distillation conditions less than the vapor pressure of said impurity to be removed, said fluxing agent having from 2 to 12 carbon atoms and containing at least 2 polar groups selected from the group consisting of hydroxyl, carboxyl, carboxy ester and ketone carbonyl and having oxygen present in the ratio of at least 1 atom per 3 atoms of carbon and selected from the group consisting of (a) aliphatic diols having 2 to 6 carbon atoms, and esters thereof with the lower fatty acids which have from 2 to 4 carbon atoms in the molecule, (b) aliphatic triols having from 2 to 6 carbon atoms and esters thereof with the lower fatty acids which have from 2 to 4 carbon atoms in the molecule, (c) esters of aliphatic di-carboxylic acids having from 4 to 6 carbon atoms and esters of malic acid with lower monohydric primary and secondary aliphatic alcohols having from 1 to 4 carbon atoms, said esters having from 5 to 10 carbon atoms in the ester molecule, (d) esters of methyl and ethyl alcohols with an acid selected from the group consisting of aconitic, tartaric and citric, the primary and secondary aliphatic monohydric alcohols which have from 1 to 5 carbon atoms and the aliphatic diols having from 2 to 6 carbon atoms in which only one hydroxyl of the diol is esterified, and subjecting said crude mixture including said fluxing agent to distillation to remove said impurity therefrom, the amount of said fluxing agent before the distilling being at least 1% by weight of the sum of weights of the polyhydric alcohol ester and the unreacted polyhydric alcohol, said fluxing agent having the property of and being present in an amount sufficient for maintaining said crude reaction mixture in a more fluid state to facilitate thereby the distillation of said impurity.

2. A process according to claim 1 wherein said fluxing agent is at least one compound selected from the group consisting of aliphatic diols having from 2 to 6 carbon atoms and esters thereof with the lower fatty acids containing from 2 to 4 carbon atoms.

3. A process according to claim 1 wherein said fluxing agent is at least one compound selected from the group consisting of (1) ethylene glycol, the propylene glycols, the butane diols, triethylene glycol, diethylene glycol and dipropylene glycol and (2) mono and di esters of compounds (1) with an acid selected from the group consisting of acetic, propionic, butyric and isobutyric acids.

4. A process according to claim 1 wherein said fluxing agent is at least one compound selected from the group consisting of aliphatic triols having from 2 to 6 carbon atoms and esters thereof with lower fatty acids which have from 2 to 4 carbon atoms.

5. A process according to claim 1 wherein said fluxing agent is at least one compound selected from the group consisting of (1) glycerine, the butane triols, and 1,2,6-hexanetriol, and (2) mono, di and tri esters of compounds (1) with an acid selected from the group consisting of acetic, propionic, butyric and isobutyric acids.

6. A process according to claim 1 wherein said fluxing agent is at least one compound selected from the group consisting of esters of aliphatic di-carboxylic acids having from 4 to 6 carbon atoms and esters of malic acid with lower monohydric primary and secondary aliphatic alcohols having from 1 to 4 carbon atoms, said esters having from 5 to 10 carbon atoms in the ester molecule.

7. A process according to claim 1 wherein said fluxing agent is at least one compound selected from the group consisting of mono and di esters of an acid selected from the group consisting of fumaric, malic, succinic, adipic and itaconic with an alcohol selected from the group consisting of methyl, ethyl, propyl and butyl alcohols.

8. A process according to claim 1 wherein said alkaline transesterification catalyst is deactivated by neutralization with a strong acid selected from the group consisting of dibasic and tribasic carboxylic acids, mineral acids and alkyl sulfonic acids.

9. A process according to claim 8 wherein said alkaline transesterification catalyst is deactivated by neutralization with an acid selected from the group consisting of citric, tartaric, fumaric, adipic, itaconic and aconitic acid.

10. A process according to claim 1 wherein said monoesterified polyhydric alcohol ester is an ester of an alcohol selected from the group consisting of sucrose, raffinose, sorbitol, mannitol and methyl glucoside with an aliphatic carboxylic acid having from 8 to 32 carbon atoms.

11. A process according to claim 10 wherein said ester is an ester of an alcohol selected from the group consisting of sucrose, raffinose, sorbitol and mannitol with an acid selected from the group consisting of caprylic, capric, lauric, myristic, myristoleic, palmitic, palmitoleic, stearic, oleic, elaidic, linoleic, linolenic, arachidic, erucic, arachidonic, behenic, lignoceric and clupanodonic acids.

12. A process according to claim 1 wherein the impurity removable by distillation is selected from the group consisting of mono and di alkyl and alkoxy alkyl amides having from 3 to 8 carbon atoms.

13. A process according to claim 12 wherein said impurity includes at least one compound selected from the group consisting of dimethyl formamide, dimethyl acetamide, dimethyl propionamide, diethyl formamide and diethyl acetamide.

14. A process according to claim 1 wherein the impurity includes N methyl pyrrolidone.

15. The process according to claim 1 wherein said monoesterified polyhydric alcohol ester is an ester of an alcohol selected from the group consisting of sucrose, raffinose, sorbitol, mannitol and methyl glucoside with an aliphatic carboxylic acid having from 8 to 32 carbon atoms; the impurity removable by distillation is selected from the group consisting of mono and di alkyl and alkoxy alkyl amides having from 3 to 8 carbon atoms; and said fluxing agent is at least one compound selected from the group consisting of (1) ethylene glycol, the propylene glycols, the butane diols, triethylene glycol, diethylene glycol and dipropylene glycol and (2) mono and di esters of compounds (1) with an acid selected from the group consisting of acetic, propionic, butyric and isobutyric acids.

16. The process according to claim 1 wherein said monoesterified polyhydric alcohol ester is an ester of an alcohol selected from the group consisting of sucrose, raffinose, sorbitol, mannitol and methyl glucoside with an aliphatic carboxylic acid having from 8 to 32 carbon atoms; the impurity removable by distillation is selected from the group consisting of mono and di alkyl and alkoxy alkyl amides having from 3 to 8 carbon atoms; and said fluxing agent is at least one compound selected from the group consisting of (1) glycerine, the butane triols, and 1,2,6-hexanetriol, and (2) mono, di and tri esters of compounds (1) with an acid selected from the group consisting of acetic, propionic, butyric and isobutyric acids.

17. The process according to claim 1 wherein said monoesterified polyhydric alcohol ester is an ester of an alchol selected from the group consisting of sucrose, raffinose, sorbitol, mannitol and methyl glucoside with an aliphatic carboxylic acid having from 8 to 32 carbon atoms; the impurity removable by distillation is selected from the group consisting of mono and di alkyl and alkoxy alkyl amides having from 3 to 8 carbon atoms; and said fluxing agent is at least one compound selected from the group consisting of mono and di esters of an acid selected from the group consisting of fumaric, malic, succinic, adipic and itaconic with an alcohol selected from the group consisting of methyl, ethyl, propyl and butyl alcohols.

No references cited.